Figure 3:
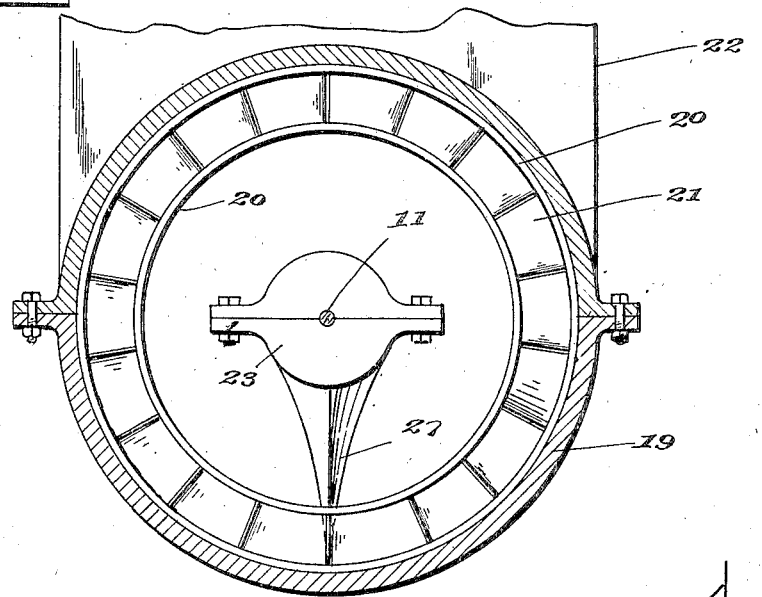

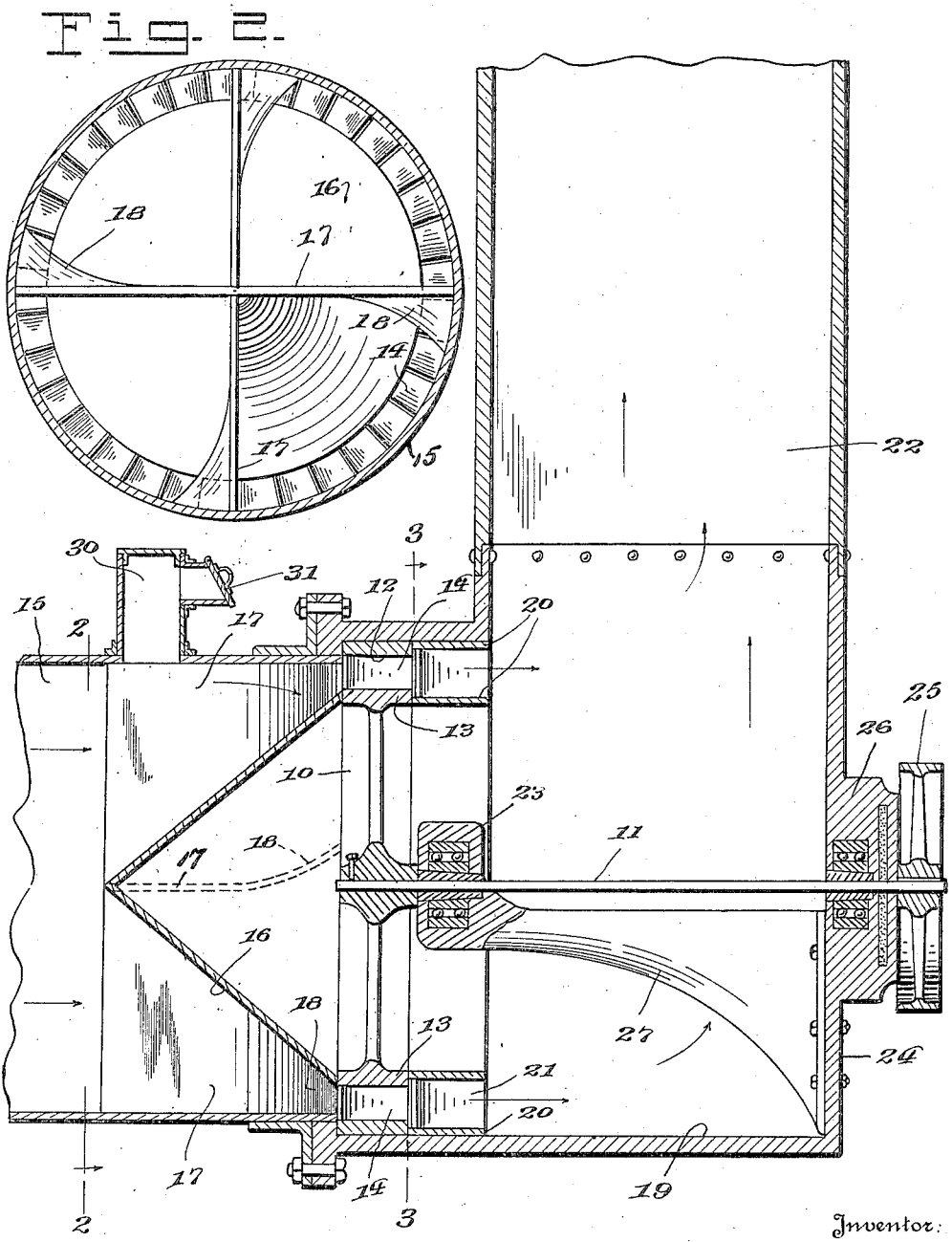

Aug. 7, 1923.                                                           1,464,070
                         I. GLANSCHNIG
                            AIR MOTOR
                      Filed Feb. 2, 1921              2 Sheets-Sheet 2

Inventor:
Ignatz Glanschnig.

By

Attorneys

Patented Aug. 7, 1923.

1,464,070

UNITED STATES PATENT OFFICE.

IGNATZ GLANSCHNIG, OF GARY, INDIANA, ASSIGNOR OF ONE-HALF TO FREDERICK E. HUMMEL, OF CHICAGO, ILLINOIS.

AIR MOTOR.

Application filed February 2, 1921. Serial No. 441,909.

*To all whom it may concern:*

Be it known that I, IGNATZ GLANSCHNIG, a subject of Austria, residing at Gary, in the county of Lake and State of Indiana, have invented new and useful Improvements in Air Motors, of which the following is a specification.

This invention relates to motors which are operated by air currents, and its object is to provide a novel and improved means for converting the energy of such medium into mechanical action.

The object stated is attained by means of a combination and arrangement of parts to be hereinafter described and claimed, and in order that the same may be better understood, reference is had to the accompanying drawings forming a part of this specification.

Figure 4:
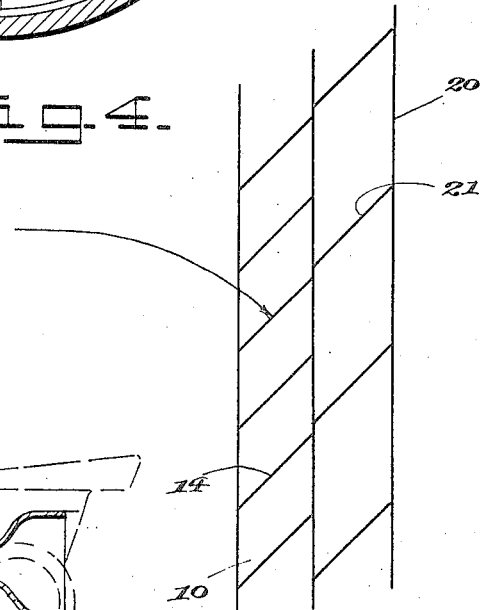
Figure 5:
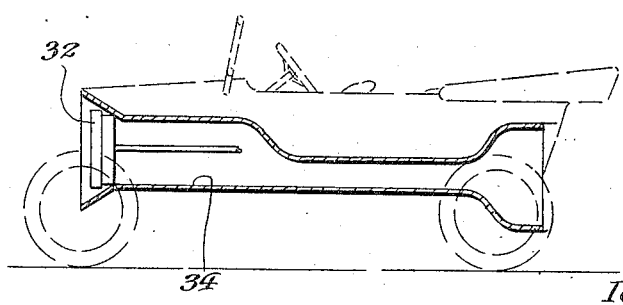

In the drawings,

Figure 1 is a longitudinal section of the motor; Figs. 2 and 3 are cross-sections on the lines 2—2 and 3—3, respectively of Fig. 1; Fig. 4 is a diagram illustrating the operation of the motor, and Fig. 5 is an elevation, largely diagrammatic, showing another application of the motor.

Referring specifically to the drawings, the energy-receiving member of the motor is a rotor in the form of a turbine wheel 10 carried by a shaft 11, and having two concentric rims 12 and 13 between which extend wings 14 which are obliquely positioned with respect to the axis of rotation, so that the action of the motive fluid against said wings results in a rotary motion of the rotor and its shaft. The rotor is positioned so that its axis is horizontal.

As the motive fluid is to be a current of air, there is provided a horizontal positioned air conduit 15 through which the air flows to the rotor, the latter being positioned at the outlet end of said conduit.

In the outlet end of the conduit 15 is mounted a deflector cone 16 having its apex pointing toward the direction from which the air is flowing. The diameter of the cone at its base is such that it is spaced from the interior of the conduit a distance equal to the width of the space between the rims 12 and 13 containing the wings 14, in view of which there is an annular air space around the base of the cone through which the air passes to the wings.

The cone 16 is supported by equidistant partitions 17 extending between its side and the interior of the conduit 15, and from the base to the apex of the cone. These partitions are radial, except near the base of the cone, where they are deflected laterally, as shown at 18, to extend across the air currents at an oblique angle. The partitions 17 serve to eliminate cross-currents in the air flowing to rotor, and the cone deflects the air to the wings 14, none of it passing through the rotor inside the rim 13. The air is further deflected by the curved ends 18 of the partitions 17 in a direction oblique to the axis of rotation, so that it does not impact against the wings in a line parallel to said axis. The wings 14 are set so as to extend at right angles to the oblique course of the annulus of air flowing past the base of the cone and deflected to such oblique course by the curves 18 of the partitions 17. This action is shown diagrammatically in Fig. 4.

The rotor 10 is mounted in a cylindrical housing 19 having upper and lower halves which are fastened together by any suitable means, and the conduit 15 is secured to the mouth of said housing where the rotor is positioned.

Immediately to the rear of the rotor 10 are two spaced and concentric rings 20 which are stationary and in alinement with the rims 12 and 13. In the space between the rings 20 are vanes 21 which are less in number than the wings 14 but extend at the same angle. The rings 20 and the vanes 21 are stationary and the air passes the same after it passes the wings 14. The purpose of these stationary vanes is to lead the air from the rotor in the same direction it has in passing the rotor, thereby reducing to a minimum the resistance or back pressure against the rotor wings 14.

After passing the vanes 21, the air enters the rear end of the housing 19 and is drawn up into a flue 22 forming an upward continuation of the housing.

The rotor shaft 11 is supported by a bearing 23 in the housing 19, and it passes through the rear wall 24 of the latter, where it is fitted with a pulley 25 for transmitting the motion of the shaft. The wall 24 also has a bearing 26 for the rotor shaft.

The bearing 23 is carried by a bracket 27 which is tapered downwardly to a sharp edge so as to present the least amount of resistance to the air flowing upwardly past the bracket to the flue 22.

For house ventilation, the conduit 15 is fitted with an intake pipe 30 provided with a lid 31, which latter is opened when ventilation is desired, whereupon the foul air is drawn into the conduit 15.

Fig. 5 shows diagrammatically how the motor may be applied to a motor vehicle. The rotor is shown at 32, and the air conduit at 34, the latter being arranged to clear the seats and the floor of the car.

I claim:

An air motor comprising a rotor having concentric and spaced rims, and peripheral wings extending obliquely therebetween, an air supply conduit leading to the rotor, a spreader cone in the conduit at the outlet end thereof, and spaced at its base from the interior of the conduit to define an annular air space therein, said air space registering with the space between the rims of the rotor, a pair of concentric and spaced stationary rings behind the rotor and in line with the rims thereof, and stationary vanes between said rings extending parallel to and being less in number than that of the rotor wings.

In testimony whereof I affix my signature.

IGNATZ GLANSCHNIG.